(12) United States Patent
Ostrom et al.

(10) Patent No.: US 7,616,456 B2
(45) Date of Patent: Nov. 10, 2009

(54) APPARATUS AND SYSTEM FOR PROVIDING TRANSIENT SUPPRESSION POWER REGULATION

(75) Inventors: Ken Ostrom, Verdes Estates, CA (US); Tim Ng, Monterey Park, CA (US); Clifford Duong, Fountain Valley, CA (US)

(73) Assignee: Primarion Corporation, Torrance, CA (US)

( * ) Notice: Subject to any disclaimer, the term of this patent is extended or adjusted under 35 U.S.C. 154(b) by 0 days.

(21) Appl. No.: 11/480,718

(22) Filed: Jul. 3, 2006

(65) Prior Publication Data

US 2006/0250119 A1 Nov. 9, 2006

Related U.S. Application Data

(62) Division of application No. 09/945,187, filed on Aug. 31, 2001.

(60) Provisional application No. 60/229,657, filed on Aug. 31, 2000, provisional application No. 60/230,154, filed on Sep. 1, 2000, provisional application No. 60/230,181, filed on Sep. 1, 2000.

(51) Int. Cl.
*H02M 3/335* (2006.01)

(52) U.S. Cl. .......................... 363/17; 323/266

(58) Field of Classification Search ......... 323/282–285, 323/222, 265, 268, 908, 266; 307/443, 75; 363/16–20, 26, 97, 98
See application file for complete search history.

(56) References Cited

U.S. PATENT DOCUMENTS

| | | | | |
|---|---|---|---|---|
| 4,341,990 A | 7/1982 | Davis | | 323/303 |
| 5,315,498 A | * | 5/1994 | Berrios et al. | 363/98 |
| 5,394,077 A | | 2/1995 | Atsumi | 323/223 |
| 5,559,423 A | | 9/1996 | Harman | 323/277 |
| 5,627,460 A | | 5/1997 | Bazinet et al. | 323/288 |
| 5,629,608 A | | 5/1997 | Budelman | 323/268 |
| 5,705,919 A | | 1/1998 | Wilcox | 323/282 |
| 5,838,145 A | | 11/1998 | Poon et al. | 560/84 |
| 5,864,227 A | | 1/1999 | Borden et al. | 323/280 |
| 5,877,611 A | * | 3/1999 | Brkovic | 323/222 |
| 5,889,392 A | * | 3/1999 | Moore et al. | 323/282 |
| 5,959,372 A | | 9/1999 | Every | 307/131 |
| 5,963,023 A | * | 10/1999 | Herrell et al. | 323/265 |
| 6,028,417 A | | 2/2000 | Ang et al. | 323/268 |
| 6,058,488 A | | 5/2000 | Eckhardt et al. | 713/503 |
| 6,064,187 A | * | 5/2000 | Redl et al. | 323/285 |
| 6,166,850 A | | 12/2000 | Roberts | 359/341.2 |
| 6,181,119 B1 | | 1/2001 | Ikeda et al. | |

(Continued)

FOREIGN PATENT DOCUMENTS

EP 0076599 9/1982

(Continued)

*Primary Examiner*—Rajnikant B Patel
(74) *Attorney, Agent, or Firm*—The Noblitt Group, PLLC

(57) ABSTRACT

A device for providing power to suppress transient load demands and a system including the device are disclosed. The device includes a sense circuit to detect when a transient event occurs and one or more transistors configured to supply or sink current to the load. The system may include a second power regulator configured to respond to fast transient power demands. In this case, a first power regulator supplies power to the load and responds to slow transient events, while the second regulator responds only to fast transient events.

18 Claims, 10 Drawing Sheets

U.S. PATENT DOCUMENTS

| | | | |
|---|---|---|---|
| 6,392,612 B1 | 5/2002 | George | 345/20 |
| 6,809,504 B2 | 10/2004 | Tang | 323/274 |

FOREIGN PATENT DOCUMENTS

| | | |
|---|---|---|
| JP | 56-96307 | 8/1981 |
| JP | 61-293160 | 12/1986 |
| JP | 63-153784 | 10/1988 |
| JP | 63-156585 | 10/1988 |
| JP | 7-222437 | 8/1995 |
| JP | 2000-47740 | 2/2000 |

\* cited by examiner

APPARATUS AND SYSTEM FOR PROVIDING TRANSIENT SUPPRESSION POWER REGULATION

CROSS REFERENCE TO RELATED APPLICATIONS

This Application claims priority to Provisional Application Ser. No. 60/229,657, entitled Efficient Shunt Regulator for Transient Suppression, filed Aug. 31, 2000; Provisional Application Ser. No. 60/230,154, entitled Methods and Apparatus for Providing Regulated Power to a Microelectronic Device, filed Sep. 1, 2000; and Provisional Application Ser. No. 60/230,181, entitled Microelectronic Power Regulation System and Methods of Forming and Using the Same, filed Sep. 1, 2000. This is a Divisional Patent Application claiming priority to parent application Ser. No. 09/945,187, filed on Aug. 31, 2001.

FIELD OF THE INVENTION

The present invention relates to power regulation systems and devices suitable for providing regulated power to a microelectronic device. More particularly, the invention relates to regulators and systems capable of altering an output of the regulator or system in response to a power demand of a load coupled to the regulator or system.

BACKGROUND OF THE INVENTION

As the speed of high performance microprocessors increases, the operating voltage of the microprocessors generally decreases while the operating current generally increases. In addition, as the performance and operating current of a microprocessor increase, the power supplied to the microprocessor tends to include more transient power spikes (large shifts in the power demanded by the microprocessor). For example, as a microprocessor executes instructions, particularly at faster rates, severe power transients are likely to occur. These severe current transients, if not properly regulated, can cause noise on the power supply that can induce errors in the microprocessor.

Typical power regulation and transient suppression systems include extensive decoupling devices, including capacitors that are placed across the load between the power supply and ground, in combination with an active voltage regulator to supply instantaneous charge to the microprocessor under dynamic operation. On-chip decoupling techniques, e.g., decoupling capacitors integrated on the die package, generally require a relatively large chip area and tend to reduce reliability of the microprocessor. Typical off-chip decoupling generally has limited effectiveness because of the parasitic inductance in the power supply leads. In addition, off-chip as well as on-chip active voltage regulation employing conventional circuit design approaches generally lack the bandwidth to respond to fast load transients and typical off-chip regulation approaches generally have limited effectiveness in responding to the transients because of the parasitic inductance between the regulation source and the load.

Wide bandwidth series linear regulators employing novel circuit design approaches can respond to the fast transients and provide significantly improved regulation over conventional approaches. However, such regulators may be problematic in several regards. For example, a wide bandwidth series linear regulator regulates an entire load current consisting of both static and dynamic current, resulting in a significant power dissipation by the wide bandwidth series linear regulator and a corresponding reduction in the efficiency of the power delivery system.

U.S. Pat. No. 5,629,608, issued May 13, 1997 to Budelman and entitled "Power Regulation System for Controlling Voltage Excursions," discloses a technique that uses a secondary voltage regulator in combination with a variable load element to provide dynamic voltage regulation. This approach uses a voltage window reference circuit to determine when to enable the high frequency secondary regulator. Because the secondary power regulator is not always "on," the overall efficiency of the power regulator is greater than the efficiency of series linear regulators. One disadvantage of this approach, however, is that the window or "dead zone" in which only the slow response, primary voltage regulator is employed, creates a limitation in the effectiveness of the regulator to respond to fast transient events. An additional disadvantage is that the fast regulator is placed in an inactive or "off" state when the output voltage is within the established window range. Accordingly, the effectiveness of the regulator to rapidly respond to fast transient events that exceed the window range is thus limited by both the sense circuitry response and the turn-on time of the regulator from the inactive or "off" state to an active or "on" state.

Accordingly, a need exists for a voltage regulator and system that overcome the problems of conventional power regulation devices and systems. In particular, regulators and systems that compensate for high current transients and that operate efficiently are desired.

SUMMARY OF THE INVENTION

The present invention provides improved power supply regulation to a microelectronic device. More particularly, the invention provides a power regulator and system configured to respond to transient load power demands in an efficient manner.

The way in which the present invention addresses the drawbacks of the now-known power regulators is discussed in greater detail below. However, in general, the invention provides improved regulators and systems that include a sense circuit configured to sense transient events and one or more regulators configured to respond to the sensed transient events.

In accordance with one embodiment of the invention, a power regulation circuit includes a primary voltage regulator, a sense circuit, and a power supply, all coupled to a load. In accordance with one aspect of this embodiment, the sense circuit is configured to sense a rate of change of voltage required or demanded by the load. In accordance with an alternate aspect, the sense circuit is configured to sense a rate of change of current demanded by the load.

In accordance with another embodiment of the invention, a power regulation system includes a primary voltage regulator, a secondary regulator designed to respond to transient power requirements, a sense circuit coupled to the secondary regulator, and a power supply all coupled to a load. The sense circuit is configured to sense a rate of change in current or a rate of change of voltage demanded by the load. In accordance with one aspect of this embodiment, the secondary regulator includes a negative transient response portion and positive transient response portion. Each response portion includes a current sense element to detect a transient event. In addition, one or both of the transient response portions may include a current boost element to decrease the response time of one or more portions of the secondary regulator.

In accordance with yet another embodiment of the invention, a power regulation system includes a primary voltage regulator, a secondary regulator, and a sense circuit coupled to a load. In this embodiment, the primary regulator produces a primary output voltage for the load and a secondary voltage, which is at a greater potential than the primary output voltage, for use by the secondary regulator. In accordance with one aspect of this embodiment, the secondary regulator includes a charge sourcing element, a charge sinking element, a sense amplifier, and circuits to control the charge sourcing and charge sinking elements. Providing power from the primary regulator directly to the secondary regulator allows the secondary regulator to continuously be in an "on" state and thereby able to quickly respond to transient load power demands. In accordance with various aspects of this embodiment, the primary regulator may include additional outputs to further increase the efficiency of the secondary regulator.

BRIEF DESCRIPTION OF DRAWING FIGURES

A more complete understanding of the present invention may be derived by referring to the detailed description and claims when considered in connection with the Figures, where like reference numbers refer to similar elements throughout the Figures, and:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g., resistors, transistors, capacitors, diodes and the like, whose values may be suitably configured for various intended purposes. In addition, the present invention may be practiced in any integrated circuit application where high-frequency, low-voltage power requirements are desired. Such general applications that may be appreciated by those skilled in the art in light of the present disclosure are not described in detail. Further, it should be noted that while various components may be suitably coupled or connected to other components within exemplary circuits, such connections and couplings can be realized by direct connection between components, or by connection through other components and devices located therebetween.

Figure 1:
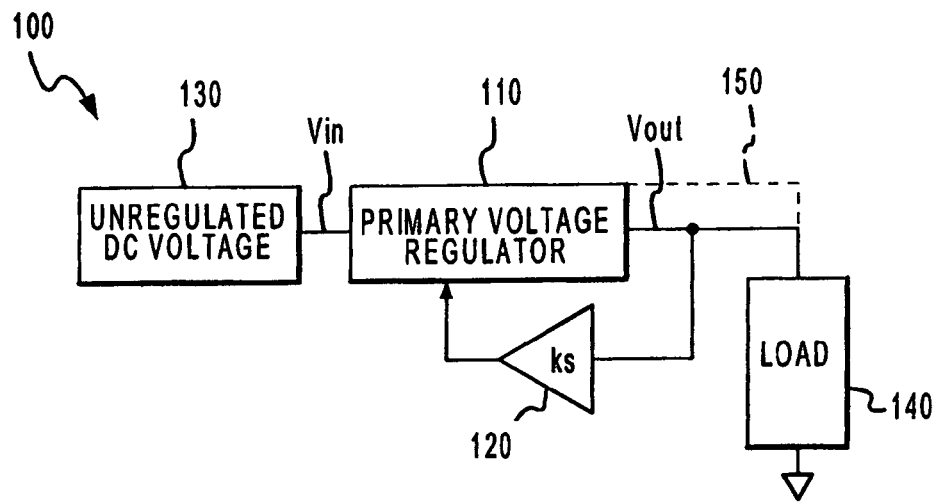
FIG. 1 is a schematic illustration of a power regulation system including a voltage sense circuit in accordance with the present invention.

A power regulation circuit or system 100 in accordance with one embodiment of the invention is illustrated in FIG. 1. Circuit 100 includes a primary voltage regulator 110 (e.g., a linear or a switching regulator with an optional feedback loop 150) and a sense circuit 120, which are coupled to an unregulated direct current (DC) power supply 130 and a load 140. Circuit 100 is configured to sense a transient power spike demanded by load 140 and transmit a corresponding signal to regulator 110, such that regulator 110 alters an operating condition and regulator 110 is better able to rapidly provide power to load 140 to counteract the transient power demand.

In accordance with the embodiment illustrated in FIG. 1, sense circuit 120 is configured to differentiate a rate of change of voltage supplied to load 140 and provide a signal to primary regulator 110 in response to the rate of change of the voltage supplied to the load whose variations are typically caused by load induced transient events. For example, if the rate of change of voltage to load 140 is small, sense circuit 120 is configured to provide an output signal which is relatively small, whereas if the load voltage rate of change is relatively large, the output signal from circuit 120 is relatively large. Primary regulator 110 can then be configured to respond to the rate of change of the voltage supplied to the load due to load induced transient events. In addition, the primary regulator may contain a secondary sense signal that is directly proportional to the voltage supplied to the load for precise DC regulation. Sense circuit 120 may be further configured to supply an output signal to regulator 110 only after a threshold rate change of voltage is sensed. Also, the response of circuit 120 may vary according to particular applications. For example, circuit 120 may be configured to supply a response that is proportional to a sensed voltage rate of change. Alternatively other transfer functions may be used to obtain a desired output signal from circuit 120.

Regulator 110 is configured to alter the current supplied to the load based on an output signal from circuit 120. In accordance with one aspect of the present embodiment, sense circuit 120 and regulator 110 are preferably configured such that regulator 110 alters a desired output value by a certain amount or to a predetermined value in response to a signal received from circuit 120. For example, the output of regulator 110 may change according to a step function in response to a signal received from circuit 120. In this case, regulator 110 may be configured to alter a current delivered to the load only for so long as the output voltage from regulator 110 is more or less than preset values—e.g., more than 110% or less than 90% of the desired operating output voltage. Alternatively, regulator 110 may be configured to alter an output voltage based on another predetermined transfer function applied to a signal received from circuit 120 (e.g., the output signal from circuit 110 may be proportional to an output signal from circuit 120). In this case, regulator 110 and/or circuit 120 may be configured such that regulator 110 alters or transforms a desired output only after a threshold voltage rate change is sensed at circuit 120.

In accordance with yet another aspect of this embodiment, regulator 110 and/or circuit 120 may be configured such that regulator 110 returns to a normal regulation mode after regulator 110 has operated under a transient regulation mode for a specified amount of time (e.g., the output signal from circuit 120 may initiate a change in the rate that regulator 110 delivers current to the load for a fixed time duration).

Figure 2:
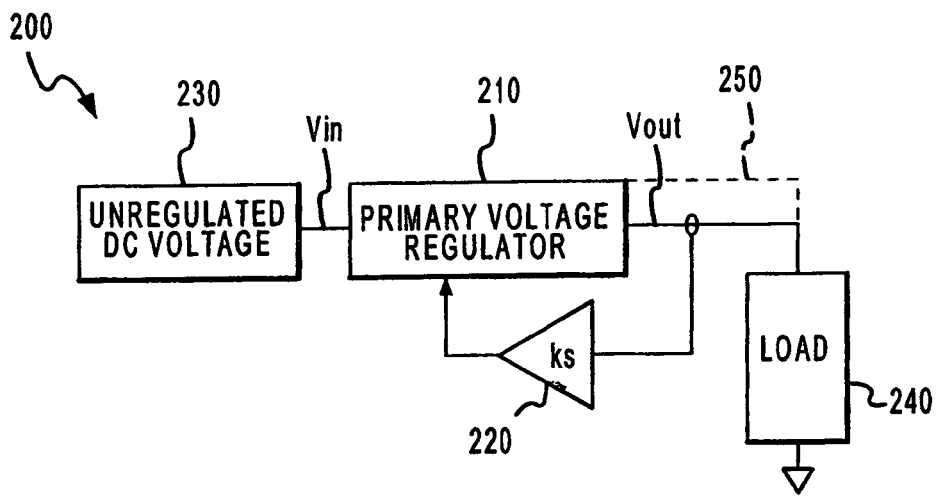
FIG. 2 is a schematic illustration of a power regulation system including a current sense circuit in accordance with the present invention.

A power regulation circuit 200 in accordance with another embodiment of the invention is illustrated in FIG. 2. Circuit 200 includes a primary voltage regulator 210 (with optional feedback loop 250) and a sense circuit 220, which are coupled to a power supply 230 and a load 240. Regulator 210, power supply 230, and load 240 may be configured and operate in a manner similar to regulator 110, supply 130, and load 140.

Circuit 200 is similar to circuit 100, except sense circuit 200 is configured to differentiate the current supplied to the load and provide a signal to the primary regulator that is proportional to the rate of change of the current demanded by the load whose variations are caused by, for example, load induced transient events. Primary regulator 210 is configured to respond relative to the rate of change of the current supplied to the load due to load induced transient events.

In accordance with one aspect of this embodiment, sense circuit 220 includes an inductor, and rate change of current supplied to load 240 is obtained by measuring a voltage drop across the inductor (e.g. the parasitic inductance of the physical connection of regulator 210 and the load 240 may form a suitable inductance sense element such that the voltage sensed across the inductor is proportional to the rate of change of the current demanded by the load). However, any suitable device which can convert a rate of change of current to an output signal may be used with the present invention. In accordance with a further aspect of this embodiment, circuit 200 may include a comparator coupled to the inductor, such that sense circuit 220 only supplies an output signal to regulator 210 when a voltage drop across the inductor meets or exceeds a predetermined value.

Figure 3:
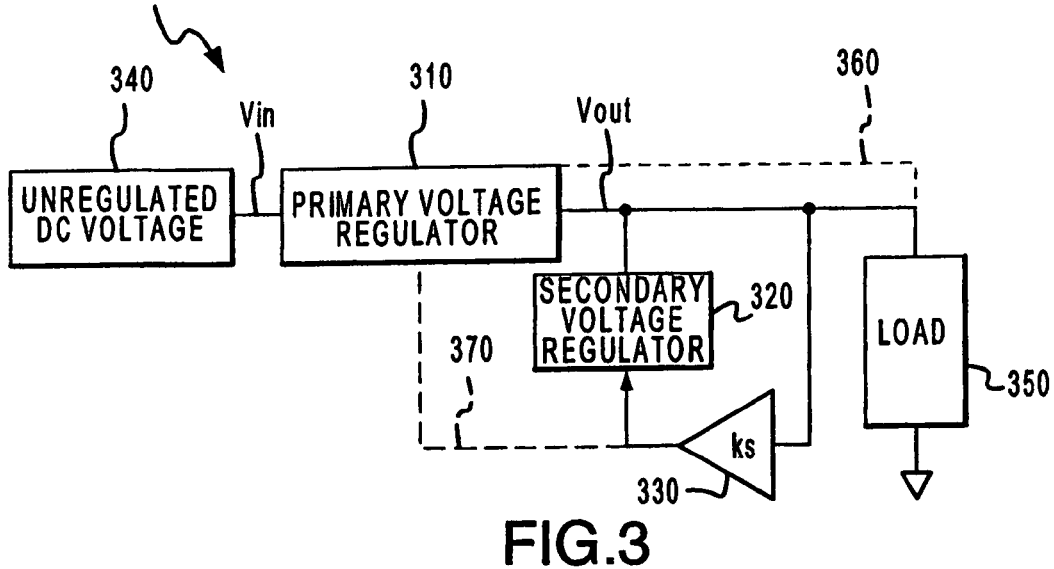
FIG. 3 is a schematic illustration of a power regulation system including a voltage sense circuit and a secondary regulator in accordance with the present invention.

A circuit 300 in accordance with yet another embodiment of the invention is illustrated in FIG. 3. Circuit 300 includes a primary voltage regulator 310 (with an optional feedback loop indicated by dashed line 360), a secondary regulator 320, and a sense circuit 330, wherein primary regulator 310, sense circuit 330 and regulators 310, 320 are coupled to a power source 340 and a load 350.

Primary regulator 310 is designed to deliver the DC and low frequency current demanded by the load while the secondary regulator is designed to supply the high frequency current demanded by the load. By way of specific example, primary regulator 310 may be configured to regulate power at frequencies ranging from direct current up to about 100 Kilohertz to about 10 Megahertz and secondary regulator 320 may be configured to regulate power at frequencies ranging on the low side from about 100 Kilohertz to about 10 Megahertz to about 10 Gigahertz on the high side.

Regulators 310 and 320 may be configured and operate in a manner similar to regulators 110 and 210. For example, regulators 310 and 320 may be configured to provide an output voltage based on the signal received from circuit 330. Alternatively, regulators 310 and 320 may be configured to operate at a single level and be "turned on" or "turned off" based on signals supplied from circuit 330. Either or both of regulators 310 and 320 may be in an "on" or "off" state at any given time.

Secondary regulator 320 is designed to respond relative to the rate of change of the voltage supplied to the load due to load induced transient events (e.g., events occurring at frequencies greater than 100 Kilohertz to about 10 Megahertz). In accordance with one aspect of this embodiment, illustrated by the dashed lines 370, primary regulator 310 also receives the sense circuit output to enable regulator 310 to respond to transient events. In addition, the primary regulator may contain a secondary sense signal that is directly proportional to the voltage supplied to the load to facilitate DC regulation.

As illustrated in FIG. 3, circuit 300 may be designed such that primary regulator 310 drives secondary regulator 320. However, in accordance with other embodiments of the invention, other power sources such as supply 340 may drive secondary regulator 320.

Sense circuit 330 may be the same as sense circuit 120, illustrated in FIG. 1, and operate in the same manner. In this case, circuit 330 differentiates the voltage supplied to the load and provides a signal to secondary regulator 320 in response to a sensed rate of change of the voltage supplied to load 350, typically caused by load induced transient events. In addition, circuit 330 may be configured to supply an output signal only after a predetermined voltage rate change is sensed and may operate using any suitable transfer function.

Figure 4:
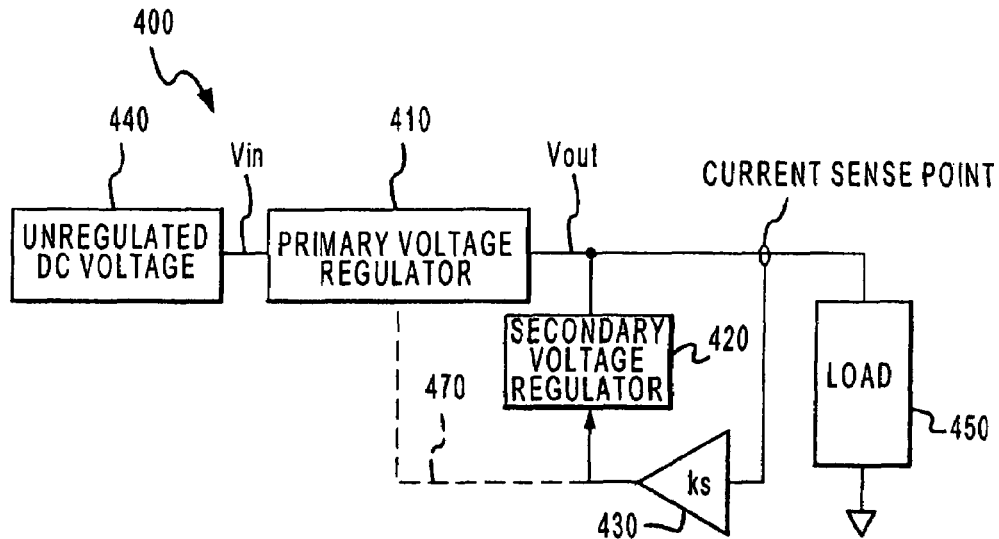
FIG. 4 is a schematic illustration of a power regulation system including a current sense circuit and a secondary regulator in accordance with the present invention.

Another circuit 400 in accordance with an exemplary embodiment of the invention is illustrated in FIG. 4. Circuit 400 includes a primary voltage regulator 410, a secondary regulator 420, and a sense circuit 430 coupled to a source 440 and load 450. Primary regulator 410 may be the same as regulator 310. Sense circuit 430 differentiates the current supplied to the load 450, thereby providing a signal to the secondary regulator that is proportional to the rate of change of the current demanded by the load 450 whose variations are caused by load induced transient events. Sense circuit 430 may be configured and operate in a manner similar to circuit 220. The secondary regulator 420 can then be designed to respond relative to the rate of change of the current supplied to the load due to load induced transient events. In accordance with one aspect of this embodiment, the primary regulator 410 would also receive the sense circuit 430 output, as indicated by the dashed lines 470, to facilitate regulator 410 response to transient events. Regulators 410 and 420 may be configured and operate in a manner similar to regulators 310 and 320.

Figure 5:
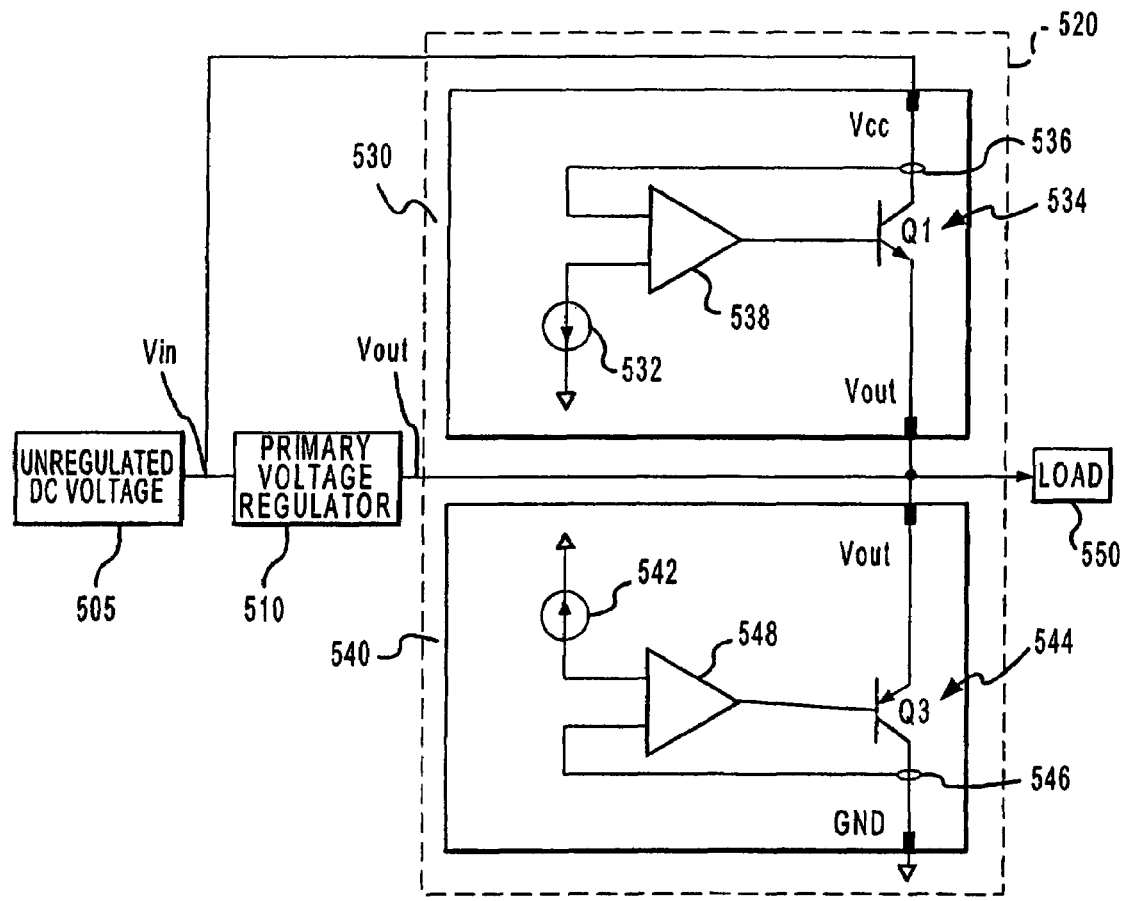
FIG. 5 is a schematic illustration of a power regulation system including a secondary regulator in accordance with another embodiment of the invention.

FIG. 5 illustrates another circuit 500 in accordance with another embodiment of the invention. Circuit 500 includes a primary voltage regulator 510 and a secondary voltage regulator 520, coupled to a power supply 505 and a load 550. Primary voltage regulator 510 converts an unregulated DC voltage (Vin) to a regulated DC voltage (Vout), as described above in connection with primary regulators 110-410.

In accordance with this embodiment, secondary voltage regulator 520 comprises a negative transient response portion 530 and a positive transient response portion 540. Exemplary negative transient response portion 530 includes a reference current source 532, an output transistor 534, a current sensing device 536, and an amplifier 538, while positive transient response portion 540 includes a reference current source 542, an output transistor 544, a current sensing device 546, and an amplifier 548. Amplifiers 538 and 548 are configured to produce an output current that is related to the difference between the reference current (from source 532 or 542) and the sense current (from device 536 or 546). The output current is used to improve regulation of the load voltage under dynamic load conditions. During operation, primary voltage regulator 510 supplies the majority of the static power to load 550 in addition to power sufficient to respond to low frequency transients that are within the bandwidth of regulator 510, thereby reducing the power dissipated by the negative and positive transient regulators 530 and 540.

Figure 6:
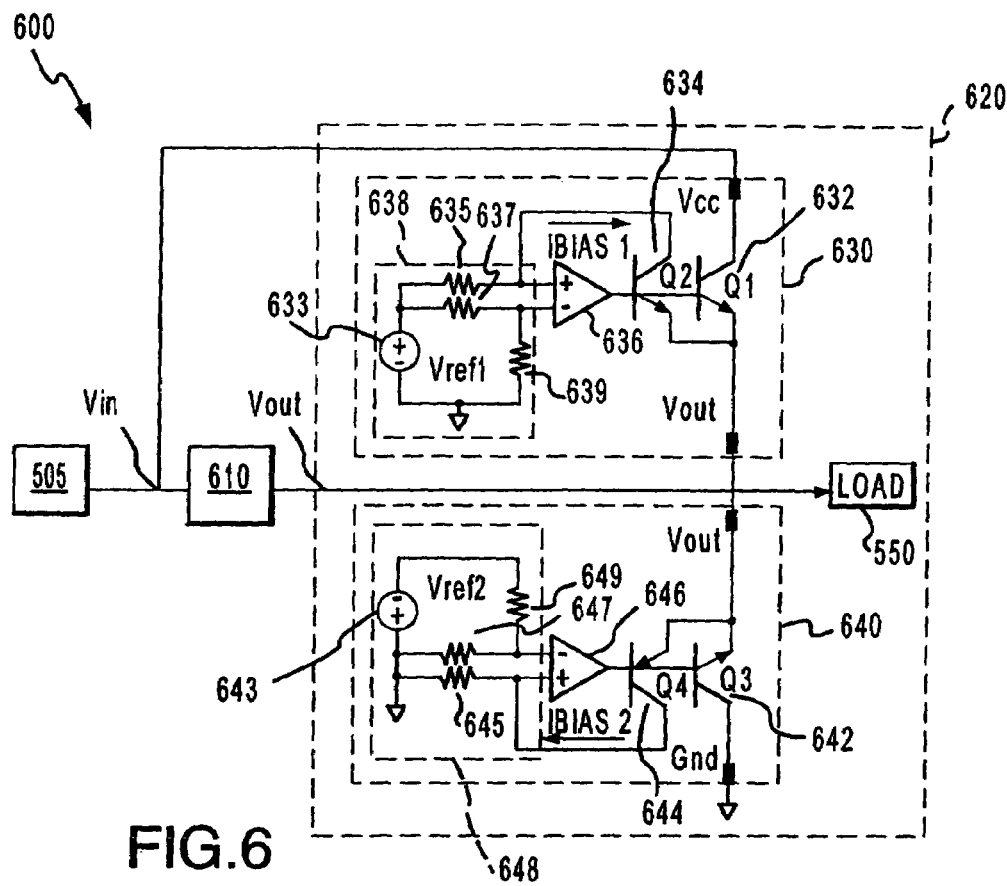
FIG. 6 is a schematic illustration of a power regulation system including a secondary regulator in accordance with another embodiment of the invention.

FIG. 6 illustrates an exemplary system 600, including a secondary regulator 620 in greater detail. In accordance with this embodiment, secondary regulator 620 again comprises a negative transient response portion 630 and a positive transient response portion 640. Negative transient response portion 630 includes an output transistor 632, a sense transistor 634, an amplifier 636, and a current reference circuit 638 including resistors 635, 637, and 639, having respective resistance values of R1, R2, and R3 and voltage reference 633, having a reference voltage of Vref1.

During the operation of negative transient regulator 630 (e.g., when a high-frequency negative transient event occurs), resistors 637 and 639 establish a voltage Vx1 which is approximately equal to Vref1*R3/(R2+R3). A current (Ibias1) is established across resistor 635 which is approximately (Vref1−Vx1)/R1. Neglecting the non-idealities of amplifier 636 the current Ibias1 is delivered to the collector of transistor 634. In this case, amplifier 636 establishes the quiescent operating point of transistor 634 such that the collector current of transistor 634 is nominally Ibias1 and is independent of voltage (Vout) supplied to load 550 by a primary voltage regulator 610.

In accordance with another aspect of the present embodiment, transistor 632 is suitably scaled in emitter area relative to the emitter area of transistor 634 such that the emitter area of transistor 632 is N times larger than that of transistor 634. For example, N can be scaled to a factor between 100 to 1000, or any other factor suitably configured to facilitate transistor 632 to be turned on essentially at all times of operation of system 600. The quiescent current of transistor 632 is approximately equal to N*Ibias1 and is nominally independent of Vout supplied to load 550 by primary voltage regulator 610. In this manner negative transient regulator 620 transistor 632 is always "on," allowing for rapid response to negative current transient events. To increase or maximize efficiency, the value of transistor 632 stand-by current (N*Ibias1) is suitably chosen to be a small fraction of the transient current delivered by negative transient response portion to load 550.

Dynamic variations in load voltage Vout, which are within the closed loop bandwidth of negative transient response portion 630, are tracked by amplifier 636 such that the current in transistor 632 is held at the stand-by level, and regulation is performed by primary voltage regulator 610. Negative-going dynamic variations in load 550 voltage Vout, such as those due to a rapid increase in the current demanded by the load 550 that is beyond the bandwidth of amplifier 636, are regulated by transistor 632. Dynamic regulation is accomplished because the base voltage of transistor 632 established by amplifier 636 lags the transient variation of Vout under this condition. The output current supplied by transistor 632 to load 550 is exponentially related to the dynamic change in transistor 632 base-emitter voltage. Voltage droop in power supply 505 under this dynamic condition can thus be reduced.

The bandwidth of amplifier 636 is selected based on factors such as the dynamic response of primary voltage regulator 610, the desired degree of high frequency voltage regulation, and the efficiency of the overall power delivery system 600. In addition, the bandwidth of 636 can be selected based on a desired time for operation of secondary voltage regulator 620 components, e.g., negative transient response portion 630. The supply voltage (Vcc) which biases the collector of transistor 632 can either be provided directly from an unregulated DC power supply 505, as illustrated in FIG. 6, or be provided as a separate power supply that may have significantly relaxed tolerance relative to Vout of primary voltage regulator 610.

Regulation of positive dynamic variations in load 550 voltage Vout due to a rapid decrease in the current demanded by load 550 are compensated for using positive transient response portion 640 in a manner similar to that described above in connection with negative response portion 630. Positive transient response portion 640 includes an output transistor 642, a sense transistor 644, an amplifier 646, and a current reference circuit 648 including resistors 645, 647, and 649, having resistance values of R4, R5, and R6, respectively, and a voltage reference 643, having a voltage of Vref2.

During the operation of positive transient response portion 640, resistors 649 and 647 establish a voltage Vx2 which is approximately equal to Vref2*R5/(R5+R6). A current (Ibias2) is established across resistor 645 which is approximately (Vx2)/R4. Assuming an ideal amplifier 646, the current Ibias2 is delivered to the collector of transistor 644. Amplifier 646 establishes the quiescent operating point of transistor 646 such that the collector current of 644 is nominally Ibias2 and is independent of the voltage (Vout) supplied to load 550 by primary voltage regulator 610.

As described above with respect to transistor 632 of negative transient response portion 630, transistor 642 can be suitably scaled in emitter area relative to the emitter area of transistor 644, such that the emitter area of transistor 642 is K times larger than that of the area of transistor 644. For example, K can be scaled to a factor between 100 to 1000, or any other factor suitably configured to facilitate transistor 642 to be turned on essentially at all times. The quiescent current of transistor 642 is approximately equal to K*Ibias2 and is nominally independent of Vout supplied to load 550 by primary voltage regulator 610. In this manner, the positive transient response portion 640 transistor 642 is always "on," enabling rapid response to transient events. The value of transistor 642 stand-by current (K*Ibias2) is chosen to be a small fraction of the transient current delivered by transistor 642 to load 550 to increase efficiency. Dynamic variations in load voltage Vout, which are within the closed loop bandwidth of positive transient response portion 640, are tracked by amplifier 646, such that the current in transistor 642 is held at the stand-by level, and regulation is performed by primary voltage regulator 610. Positive-going dynamic variations in Vout due to a rapid decrease in the current demanded by the load that is beyond the bandwidth of amplifier 646 are regulated by transistor 642. Dynamic regulation is accomplished because the base voltage of transistor 642 established by amplifier 646 lags the transient variation of Vout under this condition. For transistor 642 comprising a bipolar transistor, the output current sourced by transistor 642 from the load is exponentially related to the dynamic change in transistor 642 base-emitter voltage, i.e., $I_E \cong k_1 e^{(Vbe/Vt)}$, where $k_1$ and Vt are constants, $I_E$ is the emitter current of transistor 642 and Vbe is the base-emitter voltage of transistor 642. Voltage peak in the power supply under this dynamic condition is thus reduced.

Figure 7:
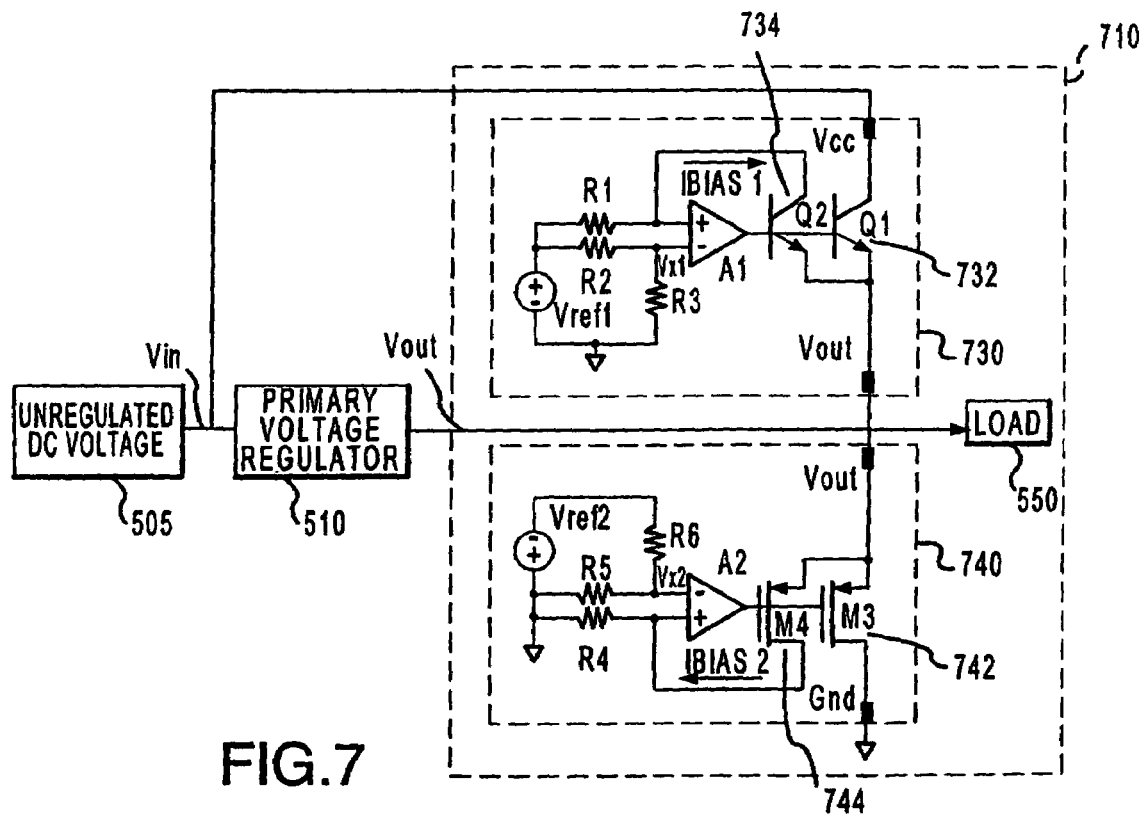
FIG. 7 is a schematic illustration of a power regulation system including a secondary regulator in accordance with yet another embodiment of the invention.
Figure 8:
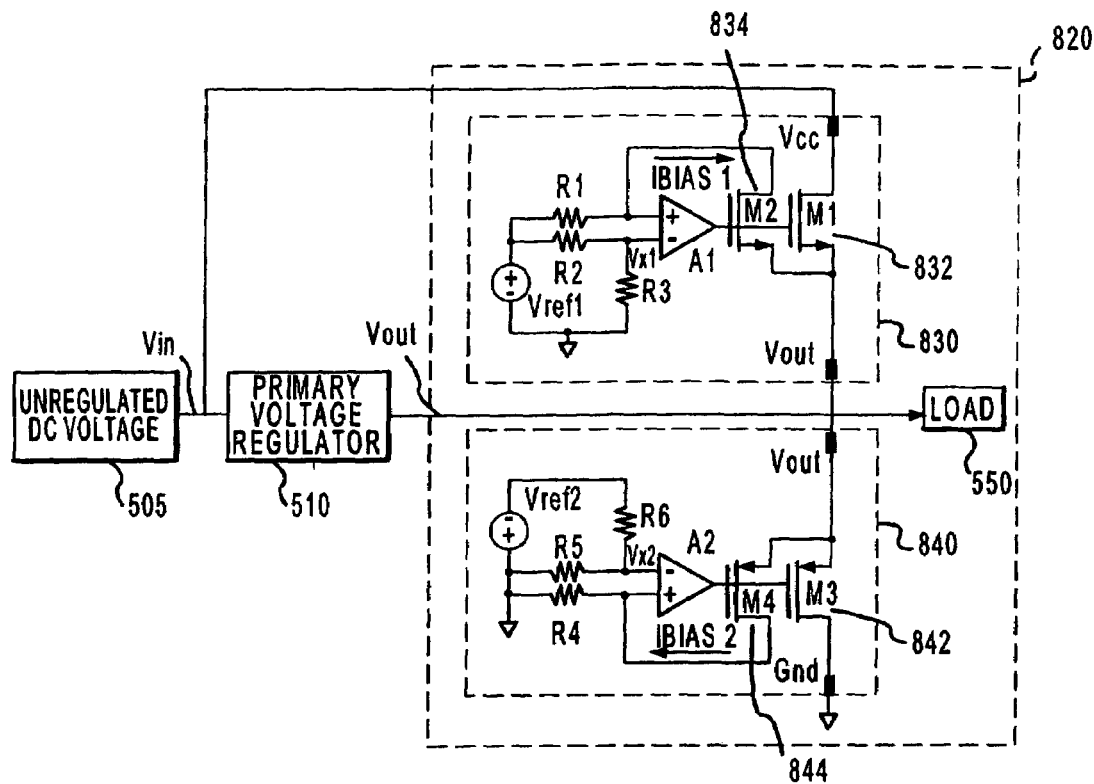
FIG. 8 is a schematic illustration of a power regulation system including a secondary regulator in accordance with yet another embodiment of the invention.

The bandwidth of amplifier 646 is selected based on factors such as dynamic response of primary voltage regulator 610, secondary voltage regulator components, e.g., positive transient regulator 640, the desired degree of high frequency voltage regulation, and the efficiency of power delivery system 600. As discussed above with respect to FIG. 6, output transistors 632 and 642 can comprise any transistor configuration for providing an output current. For example, with reference to FIG. 7, a secondary voltage regulator 710 may include bipolar transistors 732 and 734 for the output transistor and current transistor of a negative transient response portion 730, while the output transistor 742 and current transistor 744 are P-channel MOS devices for positive transient portion 740. Moreover, as illustrated in FIG. 8, an output transistor 842 and current transistor 844 of positive transient response portion 840 of a secondary regulator 820 can comprise P-channel MOS devices while an output transistor 832 and current transistor 834 of a negative transient response portion 830 can comprise N-channel MOS devices. It should be noted that other variations and combinations are contemplated in accordance with various other embodiments of the present invention.

Figure 9:
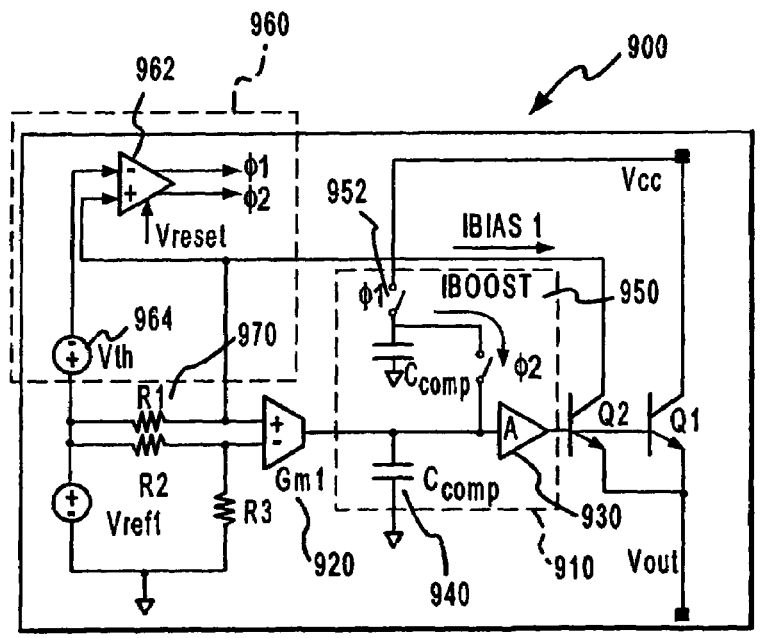
FIG. 9 is a schematic illustration of a portion of a secondary regulator in accordance with the present invention.

In accordance with another exemplary embodiment, negative and/or positive transient response portions can be suitably implemented with a boosting circuit to facilitate the acceleration of the overall regulator response to transients at a load. FIG. 9 illustrates a negative response portion 900, suitable for use in a secondary regulator as described herein. Portion 900 includes an amplifier 910 including an input transconductance stage 920 (Gm1) and an output amplifier stage 930. A compensation capacitor 940 is included to provide frequency compensation to amplifier 910 for stable operation. In addition, portion 900 includes a transient boost circuit 950 including a boost capacitor 952 and switches N1 and N2, and a sense circuit 960 comprising a comparator/switch driver 962, and a threshold voltage reference 964.

During operation, switch N1 is initially closed and switch N2 is opened thereby charging capacitor 952 to the supply voltage Vcc. During a fast load transient event, the voltage drop created across a resistor 970, having a resistance value of R1, is sensed and compared to a pre-determined trip voltage (Vref1−Vth). When a load current transient event results in a drop across resistor 970 in excess of the trip voltage (Vref1−Vth), sensing circuitry 960 opens switch N1 and closes switch N2, thereby providing additional stored charge to boost the voltage across capacitor 940, which can then be suitably buffered by the output amplifier with gain A, for example unity gain, thereby reducing response time of the regulator to a transient load event and hence improving the transient voltage regulation accuracy.

Figure 10:
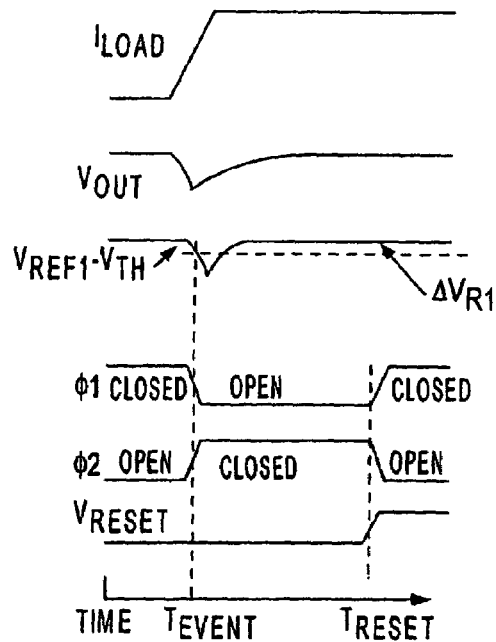
FIG. 10 illustrates load transient and regulator waveforms for the exemplary system illustrated in FIG. 9.

Waveforms illustrating the load transient and regulator waveforms are shown in FIG. 10. In accordance with another aspect of this embodiment, to increase an effectiveness of the boost capacitor 952, sensing circuitry 960 can behave as a one-shot with a reset such that switches N1 and N2 change from closed to open and open to closed, respectively, only once. This reset occurs when the threshold voltage Vth is initially crossed, and in which the switches N1 and N2 are internally reset after a time interval equal to $t_{reset}-t_{event}$ which is selected to be larger than the expected duration of the fast load transient event.

In addition, the comparator/switch driver of sensing circuitry 960 can be configured to produce either a bi-state output or an error proportional signal that is provided to the primary voltage regulator 510 to improve the transient performance. Moreover, it should be noted that the boost circuitry described for the negative transient suppression portion 900 can be readily extended to a positive transient response portion. Still further, it should be noted that the above boost circuitry could be used in only one of the transient suppression portions, or in both the negative and positive transient suppression portions of a secondary regulator.

Additionally, it should be noted that in the above exemplary embodiments, the negative transient suppression portion and positive transient suppression portion can be used in combination with the primary voltage regulator, or each transient regulator can be used individually with the primary voltage regulator, e.g., a configuration consisting of a negative transient suppression portion and primary voltage regulator need not contain a positive transient suppression portion. Other combinations are also herein contemplated in the present invention.

FIGS. 11-20 illustrate power regulation systems and operation of the systems in accordance with another embodiment of the invention. The systems illustrated in FIGS. 11-20 are similar to the previously described systems, except the systems illustrated in FIGS. 11-20 includes a primary voltage regulator, having at least one additional voltage output to increase the efficiency of the system.

Figure 11:
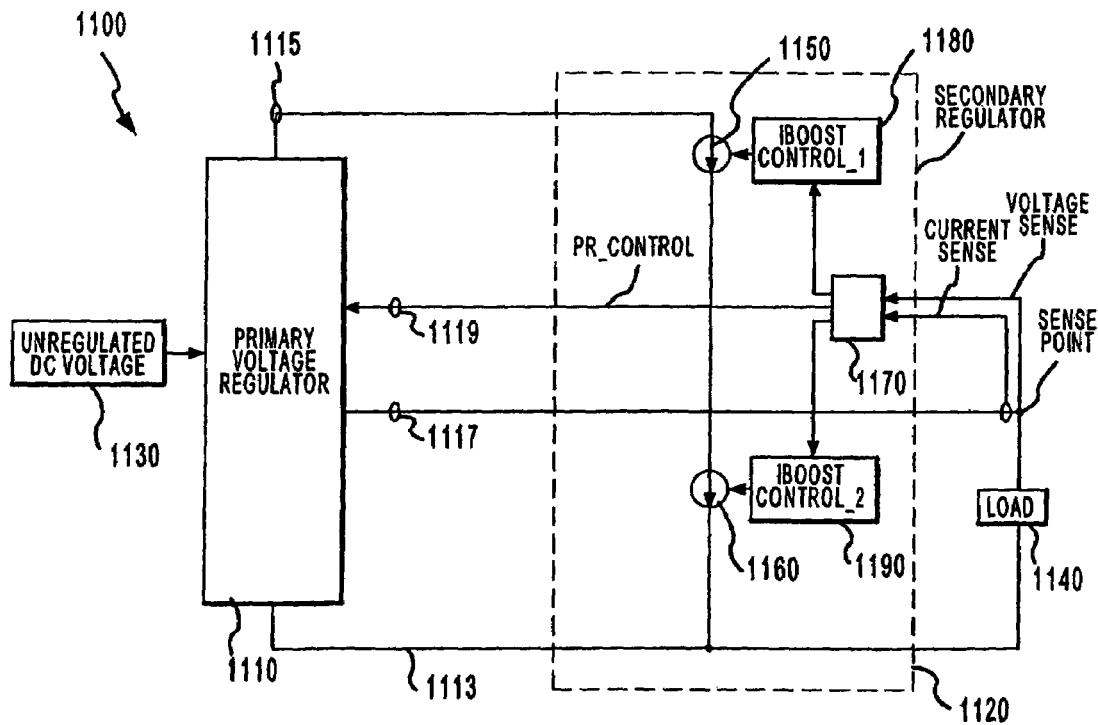
FIG. 11 illustrates a power regulation system, wherein a primary voltage regulator includes a secondary output voltage for use by a secondary regulator in accordance with another embodiment of the invention.

A system 1100 in accordance with an exemplary embodiment of the invention is illustrated in FIG. 11. System 1100 includes a primary voltage regulator 1110 and a secondary regulator 1120. Primary voltage regulator 1110 converts an unregulated DC voltage from a source 1130 to a regulated DC voltage (Primary Output Voltage) that is available for use by a load element 1140. In addition, the primary voltage regulator 1110 produces a secondary DC voltage at node 1115 that has greater potential than a Primary Output Voltage at node 1117 for use by secondary voltage regulator 1120. The precision and regulation quality requirements of the secondary output voltage may be significantly relaxed relative to the requirements of the primary output voltage. Secondary voltage regulator 1120 is designed to regulate or respond to fast load transients that are beyond the regulation capability of primary voltage regulator 1110. In this embodiment, secondary voltage regulator 1120 includes a charge sourcing element 1150 having an output current of Iboost1, a charge sinking element 1160 having an output current of Iboost2, a sense amplifier 1170, a circuit 1180 to control the charge sourcing element, and a circuit 1190 to control the charge sinking element.

In accordance with the illustrated embodiment, sense amplifier 1170 senses, at or near load 1140, a rate of change of current and produces an output signal whose magnitude depends on the sensed rate of change of the load current (e.g., the signal may be proportional to the sensed rate of change), thereby allowing the secondary regulator to distinguish between load transient events that can be regulated by the primary voltage regulator and transient events that require the secondary regulator to respond for maximum overall system regulation effectiveness and efficiency. Circuits 1180 and 1190 translate the sense amplifier 1170 outputs into signals suitable for control of sources 1150 and 1160 respectively. Circuits 1180 and 1190 may be any suitable circuit that translates a signal received from amplifier 1170 and outputs a corresponding signal. Further, circuit 1190 may be disabled when circuit 1180 is active, and circuit 1180 may be disabled when circuit 1190 is active to increase efficiency of system 1100. Sense amplifier 1170 output (PR_Control 1119) can also be passed back to primary voltage regulator 1110 to assist the primary voltage regulator's transient response (e.g., the sense amplifier PR_Control signal can determine the extent that regulator 1110 responds to the sensed dynamic load event). In addition, sense amplifier 1170 may include a voltage sense input that can be used to further match secondary regulator 1120 response to the load. For example, the voltage sense input can be used to determine if secondary regulator 1120 output current responds disproportionately relative to the load transient and thereby minimize or at least reduce any resulting over-boosting or under-boosting of the voltage via feedback control. Further, circuit 1180 and circuit 1190 may be driven directly by a signal provided by load element 1140 which indicates a change in dynamic current requiring the secondary regulator to respond for the purpose of regulation of the voltage supplied to load 1140.

Figure 12:
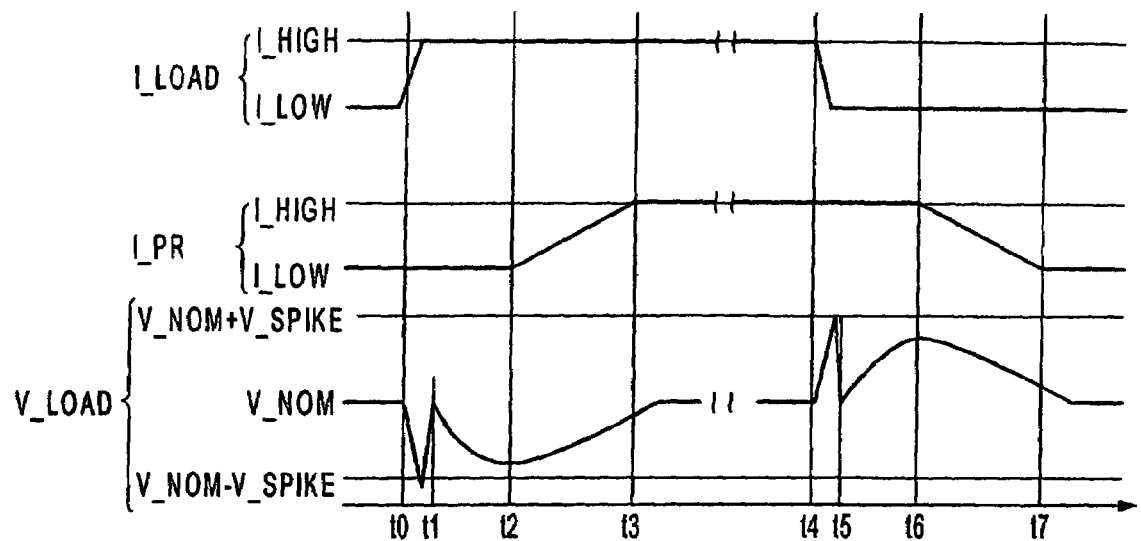
FIG. 12 illustrates load transient and regulator waveforms of a primary regulator.

Typical current waveforms of system 1100 in the absence of the secondary regulator element 1120 are illustrated in FIG. 12 and serve to illustrate the operation of the regulation system. First, consider the condition whereby the load current (I_Load) rapidly transitions from a low current state (I_low) to a high current state (I_high) beginning at time t0 at such a rate that primary voltage regulator 1110 cannot immediately source the demanded charge. The voltage at the load element (V_Load) rapidly transitions from a desirable nominal voltage (V_nom) to an undesirable voltage (V_nom−V_spike) as the dynamic charge is temporarily provided to the load by capacitive storage elements in close proximity to load 1140. The magnitude of V_spike is related to the size and non-idealities of the local capacitive element and parasitic inductance between the local capacitor and the load. Between time t1 and t2, the local capacitive storage elements cannot supply the full amount of charge demanded by the load resulting in a sag in the load voltage (V_Load). Primary regulator 1110 then responds at time t2 and begins to respond to the increase in demanded load current. At time t3 primary regulator 1110 output current now meets the current demanded by load 1140 and the voltage supplied to load 1140 (V_Load) finally returns to the desired nominal voltage (V_nom).

As the load current (I_Load) rapidly transitions from a high current (I_high) to a low current (I_low) beginning at time t4 at such a rate that primary voltage regulator 1110 cannot immediately respond to the change in load current, the voltage at the load element (V_Load) rapidly transitions from a desirable nominal voltage (V_nom) to an undesirable voltage (V_nom+V_spike) as the dynamic load charge is momentarily absorbed by capacitive storage elements in close proximity to the load. Between time t5 and t6, the local capacitive storage elements absorb the charge provided by the primary regulator that is no longer demanded by the load, resulting in an undesirable boost in the load voltage (V_Load). The primary regulator then responds at time t6 due to inherent response time limitations and begins to respond to the decrease in demanded load current. At time t7 the primary regulator output current now matches the current demanded by the load and the voltage supplied to the load element (V_Load) returns to the desired nominal voltage (V_nom).

Figure 13:
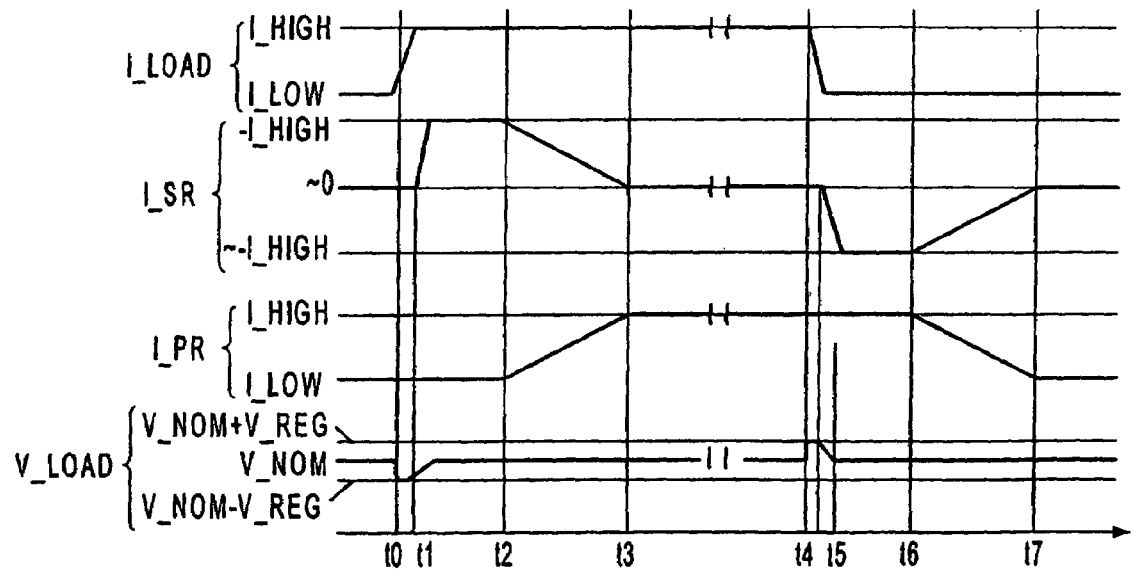
FIG. 13 illustrates load transient and regulator waveforms of a power regulation system in accordance with the present invention.

Typical current waveforms of system 1100 in accordance with one embodiment of the invention are illustrated in FIG. 13 and serve to further illustrate the operation of the improved regulation system. First consider the condition whereby the load current (I_load) rapidly transitions from a low current state (I_low) to a high current state (I_high) beginning at time t0 at such a rate that primary voltage regulator 1110 cannot immediately source the demanded charge. Secondary regulator 1120 then responds at time t1 and rapidly provides the demanded increase in load current (e.g., using Iboost1 1150 and circuit 1180) as shown by the I_SR waveform of FIG. 13. Secondary regulator 1120 is preferably designed in such a way as to minimize the time between t0 and t1. The rapid delivery of dynamic charge to the load by secondary regulator 1120 results in a significant improvement in the dynamic regulation accuracy of the voltage supplied to load 1140 (V_Load) such that the dynamic perturbation is reduced to $V_{13}$ nom−V_reg where V_reg is <<V_spike of FIG. 12. Secondary regulator 1120 continues to provide the demanded load current until such time that primary voltage regulator 1110 can respond which begins at time t2, thereby maintaining the desired nominal load voltage (V_nom). In accordance with the illustrated embodiment, during the transition period between time t2 and t3, secondary regulator 1120 output current response is designed to approximately inversely match the response of primary voltage regulator 1110 (I_PR) for maximum regulation accuracy, i.e. the sum of the current provided by primary regulator 1110 (I_PR) and secondary regulator 1120 (I_SR) approximately equals load element 1140 current (I_Load). Overall efficiency is maximized when secondary regulator 1120 output current hold time (t2−t1) and transition time (t3−t2) is minimized. Further, the transition time (t3−t2) may be a function of the magnitude of the dynamic load element current, e.g., transition time (t3−t2) may be of constant slope with absolute time duration proportional to the magnitude of the dynamic load element current (I_high−I_low). Overall regulation system 1100 efficiency can be readily traded for regulation accuracy by accelerating the transition response of the secondary regulator 1120 such that the secondary regulator 1120 response no longer approximately matches the response of the primary regulator 1110. At time t3, the secondary regulator circuitry is reset to enable response to the next load transient event requiring regulation.

As the load current (I_Load) rapidly transitions from a high current (I_high) to a low current (I_low) beginning at time t4 at such a rate that primary voltage regulator 1110 cannot immediately respond to the change in load current, secondary regulator 1120 responds at time t5 and rapidly sinks (e.g., using source 1160 and circuit 1190) the change in load current as shown by the I_SR waveform of FIG. 13. Secondary regulator 1120 is preferably designed in such a way as to minimize the time between t4 and t5. Secondary regulator 1120 continues to sink current until such time that primary voltage regulator 1110 can respond which occurs at time t6. During the transition period between time t6 and t7, secondary regulator 1120 output current response is designed to approximately inversely match the response of the primary voltage regulator 1110 (I_PR) for maximum regulation accuracy, i.e., the sum of the current provided by the primary regulator 1110 (I_PR) and secondary regulator 1120 (I_SR) approximately equals load element 1140 current (I_Load). Overall efficiency is maximized when the secondary regulator 1120 output current holdtime (t6−t5) and transition time (t7−t6) is minimized. Further, the transition time (t7−t6) may be a function of the magnitude of the dynamic load element current—e.g. transition time (t7−t6) may be of constant slope with absolute time duration proportional to the magnitude of the dynamic load element current (I_low−I_high). At time t7 the secondary regulator circuitry is reset to enable response to the next load transient event requiring regulation.

In essence, the functions of secondary regulator 1120 include satisfying the fast transient current requirements of the load and translating the initial load transient event that is beyond the regulation capabilities of primary voltage regulator 1110 to a transient profile that is within the regulation capabilities of the primary voltage regulator.

System 1100 may be configured such that the secondary regulator 1120 is segmented into multiple parallel channels to facilitate optimal transient current delivery to the load (e.g., regulator 1120 could consist of k parallel channels each delivering 1/kth of the total transient charge demanded by the load). In this case, each channel may be configured to deliver power to a portion of a load (e.g., each channel delivers power to a different location on a microprocessor) or each regulator may be configured to deliver part of the power to a single portion or location of the load. Further, the multiple channel configuration of secondary regulator 1120 could be configured to share a common sense amplifier 1170. Alternately, system 1100 may be configured such that the secondary regulator 1120 is segmented into multiple partitions where each partition may be optimized based on the physical distance between the partition and the load (e.g., a case where the load is a single monolithic integrated circuit and the secondary regulator is partitioned into a first partition consisting of a monolithic circuit or circuits placed in close proximity to the load integrated circuit and a second partition consisting of a monolithic circuit or circuits integrated directly on the load integrated circuit).

Figure 14:
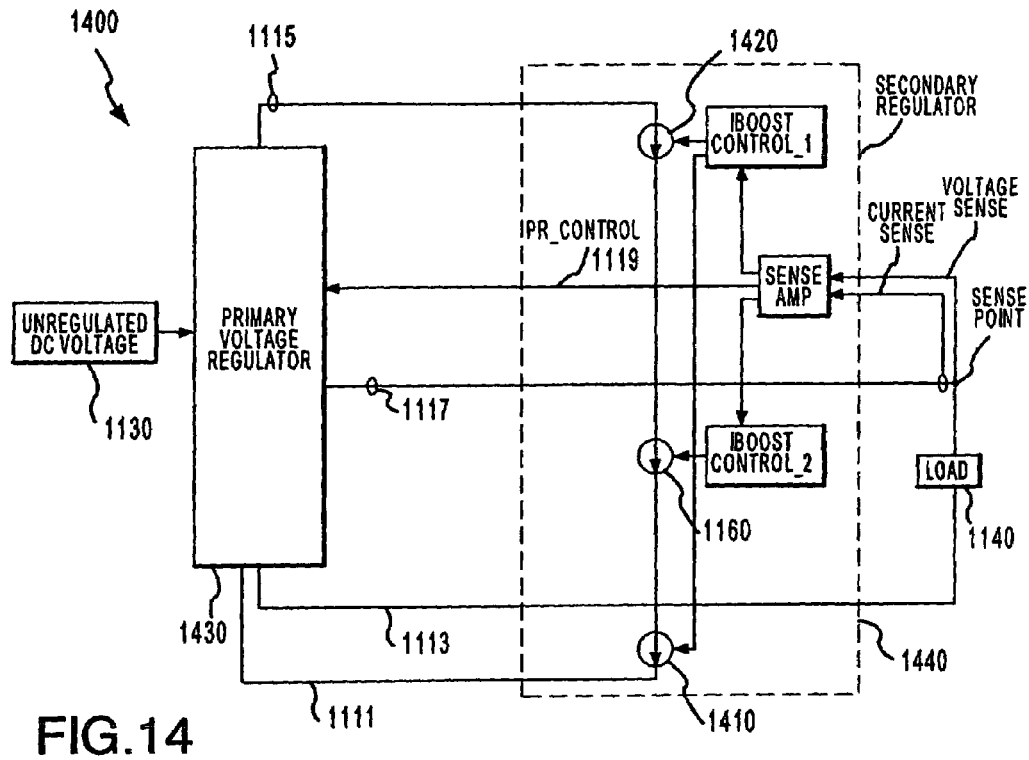
FIGS. 14-20 illustrate various embodiments of a power regulation system including multiple power regulator outputs for use by a secondary regulator.

A system 1400 in accordance with another embodiment of the invention is illustrated in FIG. 14. In this embodiment the secondary regulator contains an additional charge-sinking element 1410 having a current of Iboost1$b$ that is controlled in tandem with the charge-sourcing element 1420 having a current of Iboost1$a$, which may be the same or similar to device 1150, illustrated in FIG. 11. In accordance with this embodiment, a primary voltage regulator 1430 produces a tertiary DC voltage 1111 that is at a lower potential than ground 1113 for use by a secondary voltage regulator 1440. The precision and regulation quality requirements of the tertiary output voltage may be significantly relaxed relative to the requirements of the primary output voltage. Operation of the embodiment is essentially the same as system 1100, with Iboost1$b$ designed to match the response of Iboost1$a$ for more effective load transient event suppression.

Figure 15:
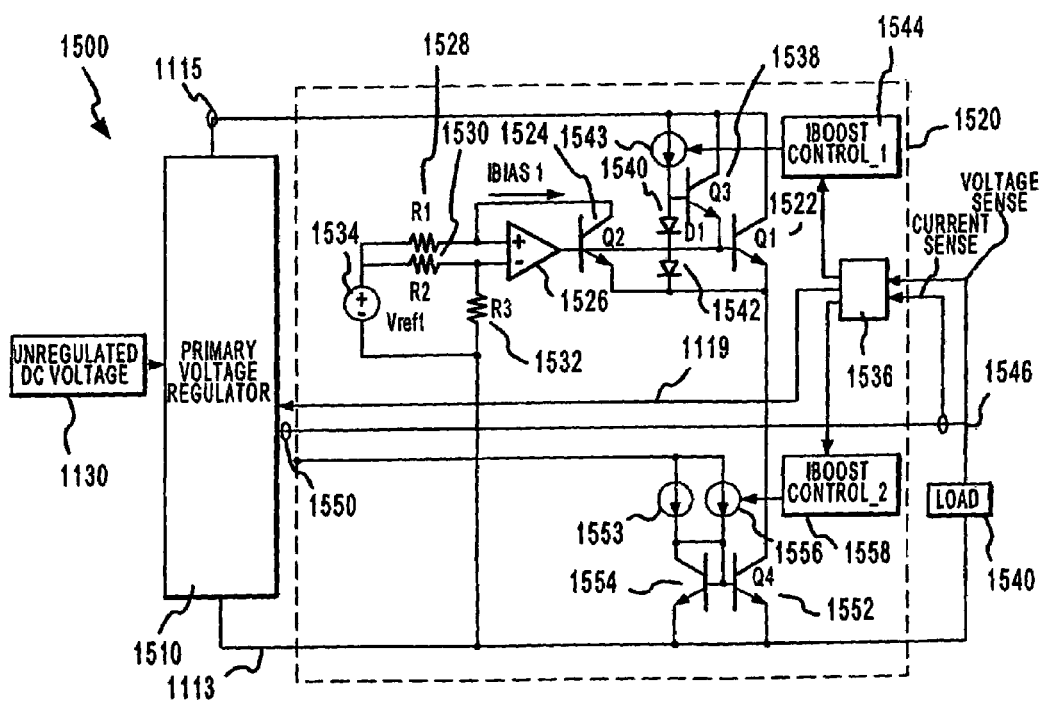

FIG. 15 illustrates, in more detail, a system 1500, in accordance with the present invention, which is similar to or may be the same as system 1100, whereby a secondary voltage regulator 1520 contains an output transistor 1522, a sense transistor 1524, an amplifier 1526, and a current reference circuit consisting of resistors 1528, 1530, and 1532, having resistance values of R1, R2, and R3, respectively, and voltage reference 1534 having an output voltage of Vref1. Resistors 1530 and 1532 establish a voltage Vx1, which is approximately equal to Vref1*R3/(R2+R3). A current (Ibias1) is established across resistor 1528, which is approximately (Vref1−Vx1)/R1. Neglecting the non-idealities of amplifier 1526 the current Ibias1 is delivered to the collector of transistor 1524. Amplifier 1526 establishes the quiescent operating point of transistor 1524 such that the collector current of transistor 1524 is nominally Ibias1 and is independent of Vout supplied to a load 1540 by primary voltage regulator 1510. Transistor 1522 is scaled in emitter area relative to the emitter area of transistor 1524 such that the emitter area of 1522 is n times larger than that of transistor 1524. The quiescent current of transistor 1522 is approximately equal to n*Ibias1 and is nominally independent of Vout supplied to the load by regulator 1510. In this manner, the circuitry including the output transistor 1522 is always "on" for rapid response to transient events. The value of transistor 1522 stand-by current (n*Ibias1) is chosen to be a small fraction of the transient current delivered by secondary regulator 1522 to load 1540 to maximize efficiency. In addition, the bandwidth of amplifier 1526 is chosen to be sufficiently low such that amplifier 1526 current control loop does not respond to fast transient load events.

Secondary regulator 1520 also contains a sense amplifier 1536, a boost transistor 1538, diodes 1540 and 1542, a controlled current source 1543 having an output current of Iboost1, and a circuit 1544 to control the current source. Initially Iboost1 is zero, diodes 1540 and 1542 are not conducting current, and transistor 1538 is reverse biased and not conducting current. Sense amplifier 1536 senses at a load point 1546 and produces an output signal whose magnitude is in proportion to or otherwise related to the rate of change of the load current, thereby allowing secondary regulator 1520 to distinguish between load transient events that can be regulated by primary voltage regulator 1510 and transient events that require secondary regulator 1520 to respond for maximum overall system 1500 regulation effectiveness and efficiency. For low-to-high current load transients, circuit 1544 translates sense amplifier 1536 output into a signal suitable for control of source 1543, which is modulated from a zero or near zero state to an active or "on" state. In response to the current from source 1543, diodes 1540 and 1542 conduct current, transistor 1538 is forward biased and conducting current, and transistor 1522 conducts current in proportion to Iboost1 and the emitter area ratio of transistor 1538, diode 1540, diode 1542, and transistor 1522. Transistor 1522 then becomes an active charge-sourcing element and responds to satisfy the demand in load current. Charge is then quickly transferred from a secondary output voltage node 1115 to primary voltage node 1550. Operation of the circuit in terms of current profiles is similar to that illustrated in FIG. 13.

The exemplary secondary regulator 1520 also contains boost transistors 1552 and 1554, a DC bias current source 1553 having an output current of Ibias2, a controlled current source 1556 having an output current of Iboost2, and a circuit 1558 to control the current source to respond to positive transient events. Initially Iboost2 is zero, transistors 1552 and 1554 are "on" and biased solely by Ibias2. Transistor 1552 is scaled in emitter area relative to the emitter area of 1554 such that the emitter area of transistor 1552 is N times larger than that of the area of transistor 1554. The quiescent current of transistor 1552 is approximately equal to N*Ibias2 and is nominally independent of the voltage supplied to load 1540 by the regulator 1510. For high-to-low current load transients, circuit 1558 translates sense amplifier 1536 output into a signal suitable for control of source 1556, which is modulated from a zero or near zero state to an active or "on" state. Transistor 1554 then drives transistor 1552 to conduct current in proportion to N times Iboost2. Transistor 1552 then becomes an active charge-sinking element and responds to satisfy the transient change in load current. Operation of the circuit in terms of current profiles is similar to that previously illustrated in FIG. 13, and secondary regulator 1520 essentially translates the initial load transient event that is beyond the regulation capabilities of primary voltage regulator 1510 to a transient profile that is within the regulation capabilities of the primary voltage regulator.

Figure 16:
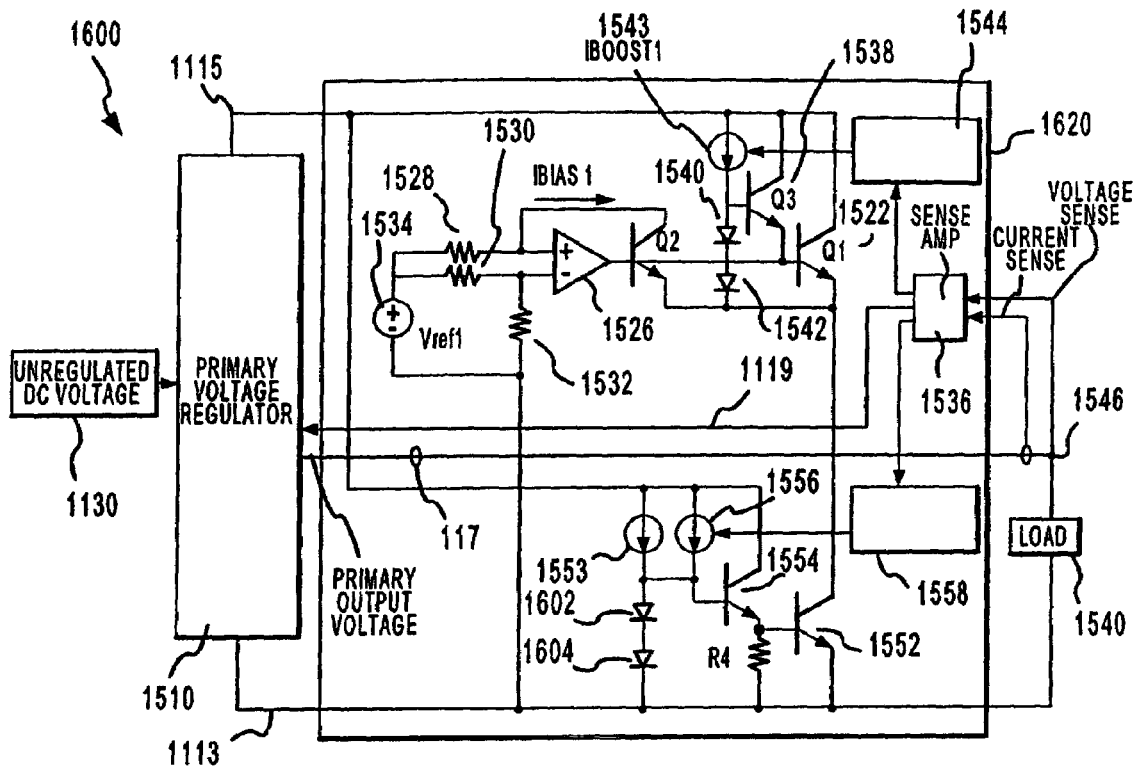

An additional embodiment of the invention is illustrated in FIG. 16. In addition to the elements of FIG. 15, the embodiment of FIG. 16 adds diodes 1602 and 1604 and a resistor having a resistance value of R4. Initially, Iboost2 is zero, and diodes 1602 and 1604, and transistors 1552 and 1554 are "on" and biased solely by Ibias2. Transistors 1552 and 1554, and diodes 1602 and 1604 are scaled in emitter area such that the quiescent current of 1552 is approximately equal to N*Ibias2 (where N>>1) and is nominally independent of the voltage supplied to the load by regulator 1510. For high-to-low current load transients, circuit 1558 translates sense amplifier 1536 output into a signal suitable for control of Iboost2 which is modulated from a zero or near zero state to an active or "on" state. Transistor 1554 and diodes 1602 and 1604 then drive transistor 1552 to conduct current in proportion to N times Iboost2. Transistor 1552 then becomes an active charge-sinking element and responds to satisfy the transient change in load current. Operation of the circuit in terms of current profiles similar to that as system 1100 and a secondary regulator 1620 translates the initial load transient event that is beyond the regulation capabilities of primary voltage regulator 1510 to a transient profile that is within the regulation capabilities of the primary voltage regulator 1510.

Although illustrated with NPN and/or PNP transistors and diodes, MOS transistors and diodes such as NMOS and PMOS transistors and diodes may be used in accordance with systems 1500 and 1600.

Figure 17:
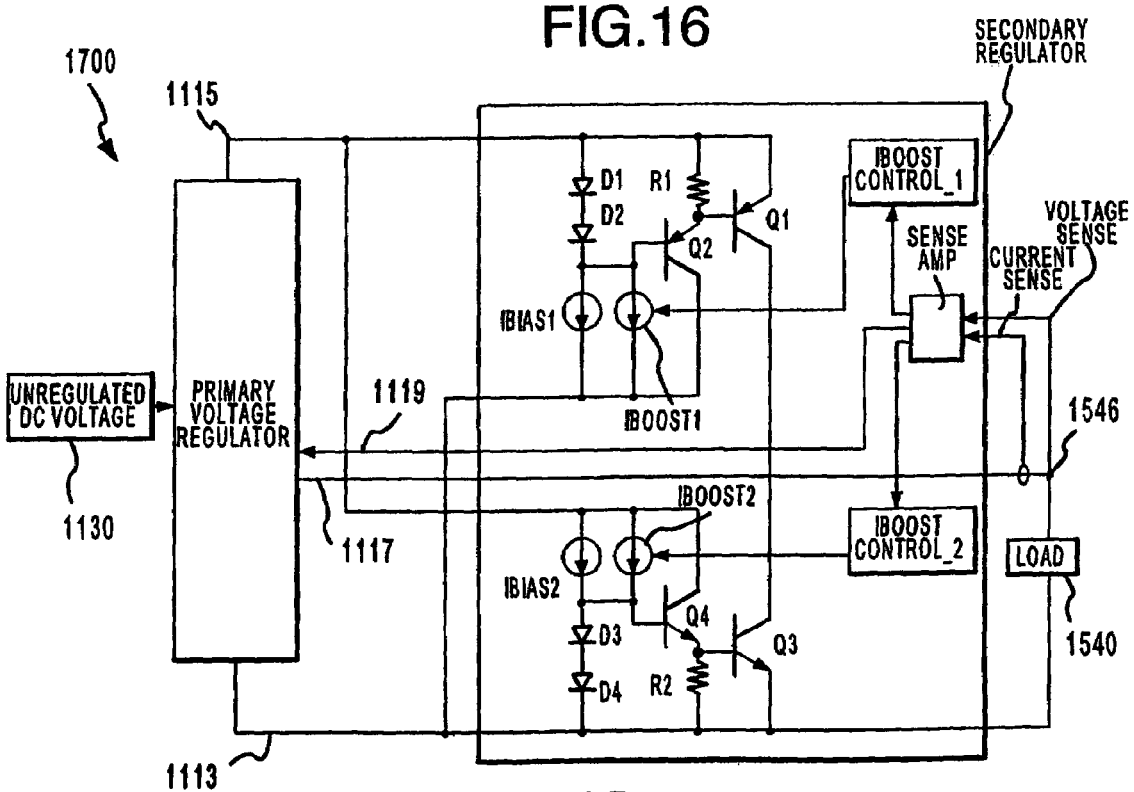

A system 1700 in accordance with another exemplary embodiment is illustrated in FIG. 17. System 1700 is similar to system 1600, except that the circuitry of system 1600 that responds to low-to-high load transient events has been replaced with a PNP equivalent of the high-to-low transient regulator.

Figure 18:
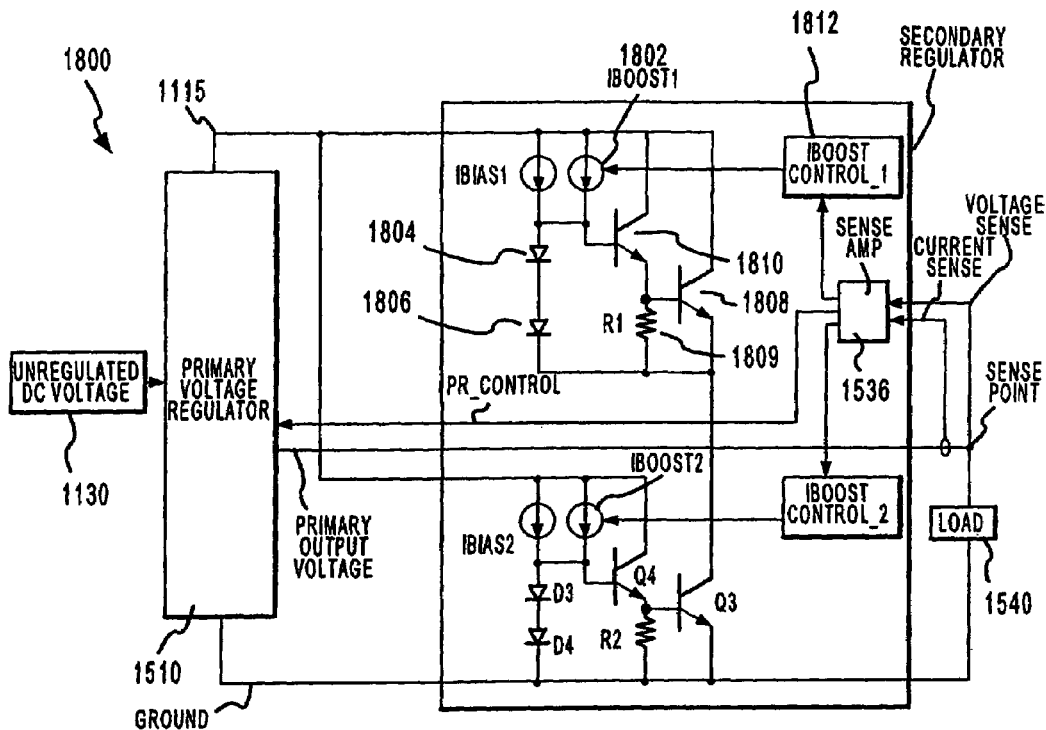

A system 1800 in accordance with another exemplary embodiment is illustrated in FIG. 18. System 1800 is similar to system 1600, except that the circuitry of system 1600 that responds to low-to-high load transient events has been replaced with the equivalent of the high-to-low transient regulator. Basic operation of the low-to-high load transient circuitry is as follows. Initially current output from a source 1802 (Iboost1) is zero, diodes 1804 and 1806 and transistors 1808 and 1810 are "on" and biased solely by Ibias1. Transistors 1808 and 1810 and diodes 1804 and 1806 are scaled in emitter area such that, along with resistor 1809, the quiescent current of transistor 1808 is approximately equal to n*Ibias1 (where n>>1) and is nominally independent of the voltage supplied to the load by regulator 1510. For high-to-low current load transients, a circuit 1812 translates a sense amplifier 1536 output into a signal suitable for control of Iboost1, which is modulated from a zero or near zero state to an active or "on" state. Transistor 1810 and diodes 1804 and 1806 then drive transistor 1808 to conduct current in proportion to n times Iboost1. The remaining circuitry operates in the same manner as system 1600.

Figure 19:
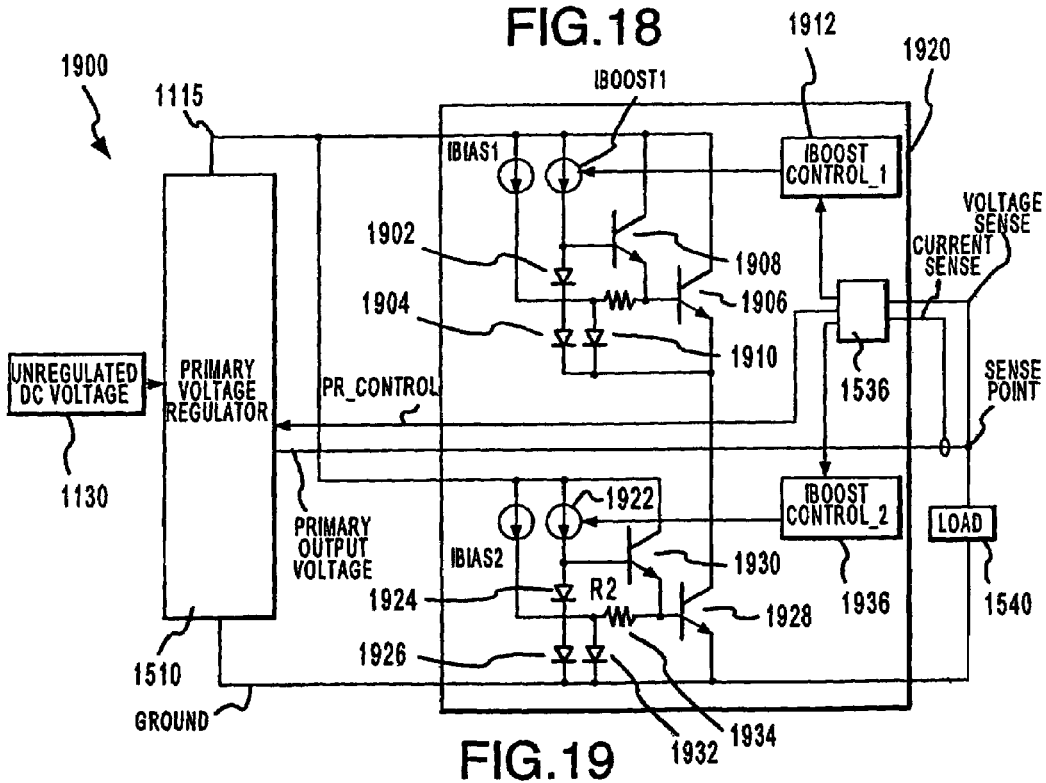

A system 1900 in accordance with another exemplary embodiment is illustrated in FIG. 19. System 1900 is similar to system 1800. Operation of the low-to-high load transient circuitry in system 1900 is as follows. Initially Iboost1 is zero, diodes 1902 and 1904 and transistor 1908 are "off." Transistor 1906 and diode 1910 are biased solely by Ibias1. Transistor 1906 and diode 1910 are scaled in emitter area such that, along with resistor, the quiescent current of transistor 1906 is approximately equal to n*Ibias1 (where n>>1) and is nominally independent of the voltage supplied to the load by regulator 1510. For high-to-low current load transients, a circuit 1912 translates a sense amplifier 1536 output into a signal suitable for control of Iboost1, which is modulated from a zero or near zero state to an active or "on" state. Transistor 1908 and diodes 1902 and 1904 then drive transistor 1906 to conduct current in proportion to n times Iboost1.

Operation of the high-to-low transient circuitry of system 1900 operates as follows. Initially, Iboost2 from a source 1922 is zero and diodes 1924 and 1926 and transistor 1930 are "off." A transistor 1928 and a diode 1932 are biased solely by Ibias2. Transistors 1928 and diode 1932 are scaled in emitter area such that, along with resistor 1934, the quiescent current of transistor 1928 is approximately equal to N*Ibias2 (where N>>1) and is nominally independent of the voltage supplied to the load by regulator 1510. For high-to-low current load transients, circuit 1936 translates sense amplifier 1536 output into a signal suitable for control of Iboost2, which is modulated from a zero or near zero state to an active or "on" state.

Transistor 1928 and diodes 1924 and 1926 then drive transistor 1928 to conduct current in proportion to N times Iboost2.

Figure 20:
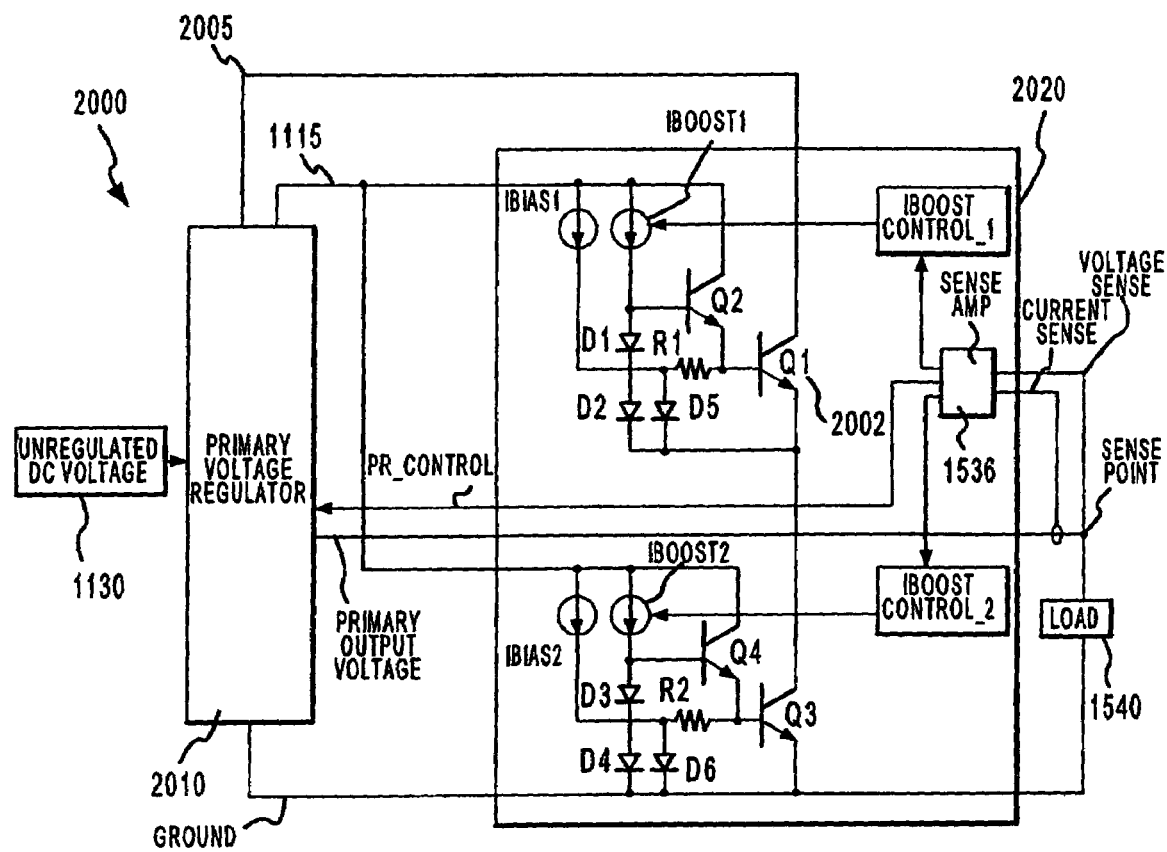

A system 2000 in accordance with another exemplary embodiment is illustrated in FIG. 20. System 2000 is similar to system 1900, except system 2000 includes a tertiary output voltage 2005 supplied to transistor 2002 from a primary voltage regulator 2010 which voltage can be a lower potential than the secondary voltage provided by primary voltage regulator 2010. The tertiary output voltage allows further optimization of the efficiency of a secondary regulator 2020.

The present invention has been described above with reference to various exemplary embodiments. However, those skilled in the art will recognize that changes and modifications may be made to the exemplary embodiments without departing from the scope of the present invention. For example, the various components may be implemented in alternate ways, such as, for example, by providing other configurations of transconductance amplifiers, e.g., with PNP transistors or configurations other than the bipolar embodiments. Moreover, while sensing circuits can be configured to sense the inductance near the load, or near ground, the sensing circuit can be configured to sense the parasitic inductance anywhere between and/or on the load circuit. These alternatives can be suitably selected depending upon the particular application or in consideration of any number of factors associated with the operation of the system. Moreover, these and other changes or modifications are intended to be included within the scope of the present invention.

We claim:

1. A microelectronic power regulator for regulating power to a microprocessor, comprising:
a first power regulator; and
a rate of change circuit configured to sense a rate of change of power distributed to the microprocessor, wherein the rate of change circuit is configured to send a signal to the first power regulator, the signal indicative of the rate of change of power distributed to the microprocessor.

2. The microelectronic power regulator of claim 1, wherein the rate of change circuit is configured to sense a rate of change of voltage distributed to the microprocessor.

3. The microelectronic power regulator of claim 1, wherein the rate of change circuit is configured to sense a rate of change of current distributed to the microprocessor.

4. The microelectronic power regulator of claim 3, wherein the rate of change circuit comprises an inductor, and the rate of change of current is determined by measuring a voltage drop across the inductor.

5. The microelectronic power regulator of claim 1, wherein the rate of change circuit includes an amplifier configured to transmit a signal to the first power regulator, the signal in proportion to the rate of change of power.

6. The microelectronic power regulator of claim 1, wherein the rate of change circuit comprises a comparator and wherein the rate of change circuit is configured to transmit a signal to the first power regulator after a predetermined rate of change of power distributed to the microprocessor is exceeded.

7. The microelectronic power regulator of claim 1, further comprising a second power regulator electrically coupled to the rate of change circuit.

8. A microelectronic power regulator system comprising:
a power source;
a first power regulator coupled to the power source and a load;
a second power regulator coupled to the power source the load; and a rate of change circuit coupled to the second power regulator, the rate of change circuit configured to detect a rate of change of power and send a signal to the second power regulator in response to the rate of change of power.

9. The microelectronic power regulator system of claim 8, wherein the rate of change circuit is further configured to send a signal to the first power regulator in response to the rate of change of power.

10. The microelectronic power regulator of claim 8, wherein the rate of change circuit is configured to sense a rate of change of voltage distributed to the microprocessor.

11. The microelectronic power regulator of claim 8, wherein the rate of change circuit is configured to sense a rate of change of current distributed to the microprocessor.

12. The microelectronic power regulator of claim 11, wherein the rate of change circuit comprises an inductor, and the rate of change of current is determined by measuring a voltage drop across the inductor.

13. A microelectronic power regulator system comprising:
a power source;
a primary power regulator coupled to the power source;
a secondary power regulator coupled to the power source, the secondary regulator configured to respond to power demands at a higher frequency than the primary power regulator; and
a rate of change circuit coupled to the secondary power regulator, the rate of change circuit configured to detect a rate of change of power and send a signal to the secondary power regulator in response to the rate of change of power.

14. The microelectronic power regulator system or claim 13, wherein the secondary regulator is coupled in parallel to a load.

15. The microelectronic power regulator system of claim 13, wherein the secondary regulator is configured to be on when power is supplied to the primary regulator and is further configured to provide power to a load only when the primary regulator cannot sufficiently supply the power demanded by the load.

16. The microelectronic power regulator system of claim 13, wherein the primary regulator is coupled in series to a load.

17. The microelectronic power regulator system of claim 13, further comprising a plurality of secondary regulators, wherein each of said plurality of secondary regulators is configured to supply power to a portion of a load.

18. The microelectronic power regulator system of claim 13, wherein the rate of change circuit is configured to receive a signal from the load, the signal indicative of power required by at least a portion of the load.

* * * * *